United States Patent
Ivers et al.

(10) Patent No.: US 6,311,110 B1
(45) Date of Patent: Oct. 30, 2001

(54) ADAPTIVE OFF-STATE CONTROL METHOD

(75) Inventors: Douglas E. Ivers; Kenneth A. St. Clair, both of Cary, NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/335,320

(22) Filed: Jun. 17, 1999

(51) Int. Cl.[7] .................. B60G 23/00; B60G 17/005; B60G 21/045; G06F 17/00
(52) U.S. Cl. ................... 701/37; 701/36; 701/38; 280/5.501; 280/5.504; 280/5.512; 280/5.515
(58) Field of Search ................... 701/36, 37, 38; 280/5.501, 5.512, 5.515, 5.504, 5.518

(56) References Cited

U.S. PATENT DOCUMENTS

| | | | |
|---|---|---|---|
| 3,807,678 | 4/1974 | Karnopp et al. | 248/358 R |
| 4,685,698 | 8/1987 | Klinkner et al. | 280/707 |
| 4,821,849 | 4/1989 | Miller | 188/280 |
| 4,887,699 | 12/1989 | Ivers et al. | 188/378 |
| 4,953,089 | 8/1990 | Wolfe | 364/424.05 |
| 5,207,774 | 5/1993 | Wolfe et al. | 137/625.32 |

(List continued on next page.)

OTHER PUBLICATIONS

Proceedings of the 27th Conference on Decision and Control, Turning Passive, Semi–Active, and Fully Active Suspension System, Miller, Lord Corporation, 88CH2531–2/88/0000–2047, IEEE, pp 2047–2053, 1988.
Lord Corporation, *"Semi–Active Suspension Technology: An Evolutionary View"* Ivers and Miller, LL–6005, 2/94.
SAE Technical Papers Series, "The control of Semi–Active Dampers Using Relative Feedback Signals", Jolly and Miller, 892483, pp. 9–17, 11/89.
United States Patent Application Ser. No.: 09/225,147, entitled "No–Jerk Semi–Active Skyhook Control Method And Apparatus", filed Jan. 4, 1999, Ahmadian et al. Attorney Docket No.: IR–2643(ES).

*Primary Examiner*—William A. Cuchlinski, Jr.
*Assistant Examiner*—Brian J. Broadhead
(74) *Attorney, Agent, or Firm*—Michael M. Gnibus (57) ABSTRACT

An Adaptive Off-state (AO) control method (55) for use in conjunction with a suspension system (10) including a controllable damper (22) interconnecting relatively moveable members (12, 14) to reduce the transmission of vibrational forces therebetween. Such suspension systems (10) are switchable between alternative on- and an off-state in accordance with a primary control method (53) and/or a secondary override control method (59). Sensors (48, 52) monitor the parameters of the suspension system (10), such as the displacement, velocity, and acceleration of the moveable members (12, 14). Damper command signals (107) are provided to the damper (22) in the on-state (116) to adjust the damping characteristics thereof. In the off-state, the damping signal in conventional systems is approximately zero or a constant relatively low magnitude. According to the present adaptive off-state control method (55), the off-state damping signal (109) to the controllable damper (22) is modulated over time to make the off-state damping a function of the system inputs. In a preferred embodiment, the modulation is a function of the real time or time-averaged input disturbances to the system (10). In an alternative embodiment, the modulation is derived from a user switch (57) that imparts a user variable Off-State Gain (OSG) to the off-state damping signal (109) based on operator perceived ride characteristics.

24 Claims, 8 Drawing Sheets

U.S. PATENT DOCUMENTS

| | | | |
|---|---|---|---|
| 5,276,622 | * 1/1994 | Miller et al. | 701/37 |
| 5,276,623 | * 1/1994 | Wolfe | 701/37 |
| 5,324,069 | 6/1994 | Ogawa | 280/707 |
| 5,390,121 | * 2/1995 | Wolfe | 701/37 |
| 5,572,426 | 11/1996 | Sasaki et al. | 364/424.05 |
| 5,609,353 | * 3/1997 | Watson | 280/707 |
| 5,712,783 | 1/1998 | Catanzarite | 364/424.046 |
| 5,802,486 | 9/1998 | Uchiyama | 701/37 |
| 5,873,437 | * 2/1999 | Danek | 188/282.2 |
| 5,878,851 | 3/1999 | Carlson et al. | 188/269 |
| 5,911,768 | * 6/1999 | Sasaki | 701/38 |
| 5,979,885 | * 11/1999 | Katsuda | 267/140.14 |
| 6,092,011 | * 7/2000 | Hiramoto | 701/37 |
| 6,148,252 | * 11/2000 | Iwasaki et al. | 701/37 |
| 6,157,879 | * 12/2000 | Kwack et al. | 701/37 |
| 6,209,887 | * 4/2001 | Kyrtsos | 280/5.515 |

* cited by examiner

ADAPTIVE OFF-STATE CONTROL METHOD

FIELD OF INVENTION

The present invention relates generally to semi-active suspension control systems and, more particularly, to an adaptive off-state control method for such suspension systems.

BACKGROUND OF THE INVENTION

Reduction of transmitted mechanical energy in the form of shock and vibration between a mass and a support, such as a vehicle body (a sprung mass) and a vehicle wheel (an unsprung mass), is a problem of considerable importance in suspension systems, cab suspensions, seat suspensions and also in the support of sensitive equipment and payloads. Such isolation systems for reducing the transmittal of shock and vibratory energy between a mass and a support are typically disposed between a mass and the support.

For purposes of this invention, prior art isolation systems will be considered as passive, active, and semi-active. Passive isolation devices such as springs or spring-damper combinations as used in most automobiles have a performance that is strictly a function of their inherent structural characteristics. Although such passive devices provide effective isolation in a certain frequency range, they are subject to amplified excitation in passing through their natural or resonant frequency range. This frequency range is determined by the spring rate of the spring and the isolated mass. Because a passive device is subject to amplified excitation at its resonant frequency, harmful effects such as damage to the isolated mass or to the passive device may occur. Further, some passive isolation systems provide adequate control of the sprung mass at the natural frequency of the suspension while imposing far too much damping force between the interconnected members at higher frequencies. Thus, the selection of damping and the amount thereof is a design compromise when using a passive device.

Active isolation systems employ an external power source, which supplies energy in a controlled manner to counteract vibrational forces and to reduce their transmission. Such active isolation systems are advantageous in that they can generate forces as a function of the vibratory condition to be controlled. However, such active systems require a large auxiliary power source and typically require additional equipment such as pumps, motors, and servovalves, which are may not be sufficiently responsive at high operating frequencies due to the limitations of such equipment to rapidly respond to control signals. Moreover, such active systems tend to be costly and require large amounts of power to operate.

A semi-active system has the inherent limitation that it can generally only produce forces opposing motion of the supported mass; it cannot generate force in the direction of motion. Thus, the term "semi-active" refers to control systems that are limited to removing energy from a system. However, semi-active systems are capable of performance nearly equivalent to that of active systems when operated in accordance with a suitable primary control method and, more particularly, control methods which emulate a so-called "Skyhook" damper such as described in Karnopp, D.C. et al., "Vibration Control Using Semi-active Force Generators," ASME Paper No. 73-DET-122 (June 1974). Semi-active dampers and various control methods for them are disclosed in Karnopp, U.S. Pat. No. 3,807,678; Miller et al., U.S. Pat. Nos. 4,821,849, 4,838,392 and 4,898,264; Boone, U.S. Pat. No. 4,936,425; and Ivers, U.S. Pat. No. 4,887,699 all owned by the assignee of the present invention.

Semi-active dampers may be either of the "on/off" type, the "orifice setting" type, or the "force controlled" type. An "on/off" semi-active damper is switched according to a suitable control method between "off" and "on" damping states. In the "on-state" the so-called damping coefficient of the damper is of a preselected, relatively high magnitude. For purposes of this invention the term "damping coefficient" means the relationship of the damping force generated by the damper to the relative velocity across the damper, which relationship is not necessarily linear. In its "off-state" the damping coefficient of the damper is approximately zero or of some relatively low magnitude.

An orifice-setting semi-active damper is also switched during operation between an "off-state", wherein the damping coefficient is approximately zero or of some relatively low magnitude, and an "on-state". However, when an orifice-setting semi-active damper is in its "on-state," the damping coefficient thereof normally is changed between a large (theoretically infinite) number of different magnitudes. The magnitude of the damping coefficient is typically determined by the diameter setting of the valve orifice of the damper.

A "force controlled" damper, in theory, is capable of creating any desired dissipative force in the "on-state" independent of the relative velocity across the damper. This is in contrast to the above described "on/off" and "orifice setting" dampers in which the "on-state" damping force depends on the relative velocity across the damper. A force-controlled damper can either be realized by use of feedback control, or by use of pressure controlled valves. In the "off-state" the force-controlled damper will command the valve to the full-open position in which the damping coefficient is approximately zero or some relatively low value.

Although semi-active suspension systems provide substantial performance advantages over other types of systems, they are known to have problems when subjected to large, abrupt input disturbances, i.e., such as those encountered on rough terrain. Excessive suspension motions and travel can result in uncomfortable or damaging force inputs to the suspension system when the suspension reaches its end of travel (either a compressed or extended condition) so as to impact the mechanical end stops of the suspension. End-stop collisions result in degraded isolation by the suspension by significantly increasing the root-mean-square (RMS) accelerations thereof. Therefore, it should be recognized that such end-stop collisions detract from ride comfort, and place undue stress on system components thereby shortening their longevity.

Semi-active isolation systems employing a abovementioned "Skyhook" control method or a derivative thereof, as described hereinafter in further detail, tend to increase the average range of suspension deflection to provide "smoother" ride characteristics, but under certain conditions, may actually increase the incidence of suspension end-stop collisions. This tendency is discussed in Miller, "Tuning Passive, Semi-active and Fully Active Suspension Systems," Proceedings of the 27th CDC of IEEE, Vol. 3, 1988 and in Ivers et al., "Experimental Comparison of Passive, On/Off Semi-active and Continuous Semi-active Suspensions," SAE Paper No. 892484, Dec. 7, 1989.

Of course, the incidence of suspension end-stop collisions can be reduced and even eliminated by utilizing a damper with a sufficiently high damping coefficient. However, this would defeat the performance advantages of semi-active control by unnecessarily limiting the range of suspension deflection for the given range of motion of the suspension and degrading the isolation of the vehicle.

A technical solution for reducing the incidence and severity of suspension end-stop collisions in semi-active isolation systems without degrading their performance is disclosed in Miller, et al., U.S. Pat. No. 5,276,622. In the ('622) patent a method and apparatus controls the operation of an isolation system having an adjustable damper interconnecting relatively movable members. The method and apparatus attenuate the transmission of forces therebetween in which relative movement of the members is restricted beyond a certain limit by one or more end stops. The conditions of operation of the isolation system are monitored by sensors to produce data indicative of relative displacement, relative velocity, acceleration or other conditions. Damper control signals are provided to the damper to adjust the damping characteristics thereof, as determined by the data, in accordance with both a primary control method and an override control method. The override control method alters the damper command signals as necessary to increase the damping characteristics of the damper at times when the isolation system is likely to meet or exceed the end stops. This minimizes the incidence of end-stop collisions.

In the ('622) patent, the primary control method receives data from the sensor(s) and produces primary command signal(s) to be used for the attenuation of forces between the members in accordance with the preselected instructions. Preferably, a semi-active control method simulating a hypothetical "Skyhook" damper is utilized. The end-stop override control method also receives data from the sensors for producing override command signals to be used for reducing end-stop collisions in accordance with the instructions of the override control method. Thus, the end-stop override (hereinafter "ESO") control method disclosed in the ('622) patent only generates force when approaching an end-stop.

Figure 1:
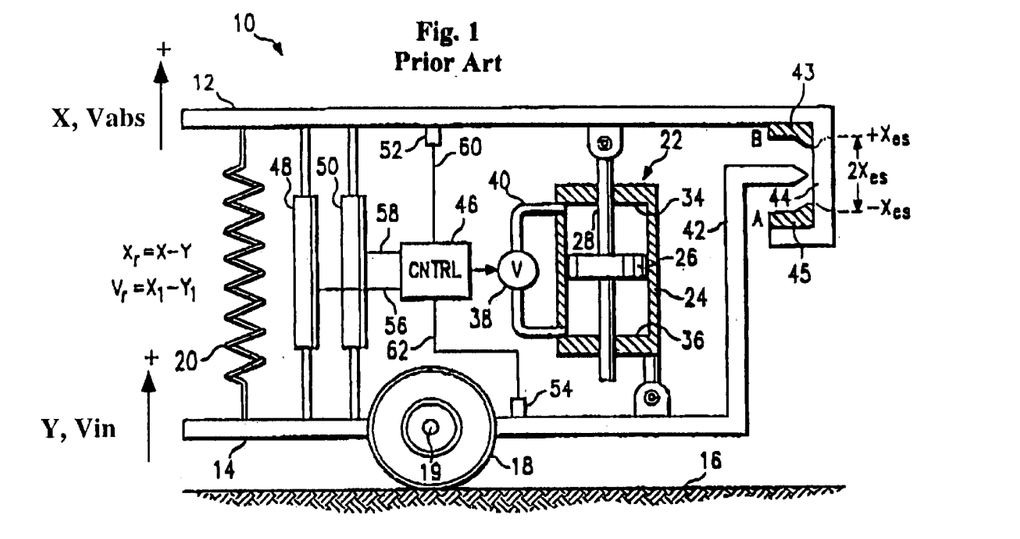
FIG. 1 is a schematic diagram view of a suspension system or similar isolation system including a semi-active damper assembly controllable in accordance with the present invention and labeled PRIOR ART.

In a preferred embodiment of the end-stop override (ESO) method described with reference to FIG. 1, the force generated is preferably a function of the instantaneous speed of approach and a distance to the end-stop. Two interlocking members 42 and 44 are respectively connected to the members 12 and 14 and schematically represent the limits of travel for the system 10. The reference letter "A" represents the extension end stop of the system 10, which is reached when the members 12 and 14 reach full extension away from each other. The reference letter "B" represents the compression end stop of the system 10, which is reached when the members 12 and 14 are in a fully compressed position. So-called snubbers 43 and 45 are respectively located at end stops B and A. The snubbers 43 and 45 are typically resilient, deformable members made of elastomeric material and serve to cushion the impact of the members 42 and 44 when engaging the end stops A and B.

The designations "X" and "Vabs" respectively denote the absolute vertical displacement and the absolute velocity of the supported member 12; it being arbitrarily indicated that these are positive when in an upper direction and negative when in a downward direction. The same sign convention in the letters "Y" and "Vin" similarly designate the absolute vertical displacement and the absolute velocity of the supporting member 14. When the system 10 is at rest, the values of X, Vabs, Y, and Vin are all zero. The designation "Xr" indicates the relative displacement between the members 12 and 14 of the system 10 and is given by the difference X−Y. When the system 10 is at rest, the relative displacement Xr is zero. The designation "+Xes" represents the relative displacement of the system 10 in full compression. The designation "−Xes" represents the relative displacement of the system 10 in full extension. It is assumed, for simplicity of illustration, that the equilibrium position is midway between end stops. The designation "Vr" represents the relative velocity of the system and is given by the difference Vabs−Vin.

A microprocessor-based controller 46 produces electronic control signals for controlling the valve 38 of the damper assembly 22 in order to select the on-state damping coefficient for optimal isolation of the supported member 12. The controller 46 operates pursuant to a control method and receives data from one or more motion sensors 48, 50, 52 and 54 associated with the members 12 and 14. The sensors 48 and 50 directly detect the instantaneous relative displacement Xr, and the instantaneous relative velocity Vr, respectively, of the members 12 and 14.

In the end-stop override (ESO) system, the data from the sensors 48 and 50 is sent via lines 56 and 58 to the controller 46. The sensor 52 detects the absolute vertical acceleration "a" of the member 12 and sends this data via line 60 to the controller 46. The acceleration data from the sensor 52 may be utilized to derive displacement, absolute velocity, and/or relative velocity data. Since the data produced by the sensors 48, 50 can also be derived from the data produced by the acceleration sensors 52 and 54, it will be appreciated by those skilled in the art that not all of the illustrated sensors need be employed in association with the system 10 at any one time.

Figure 2:
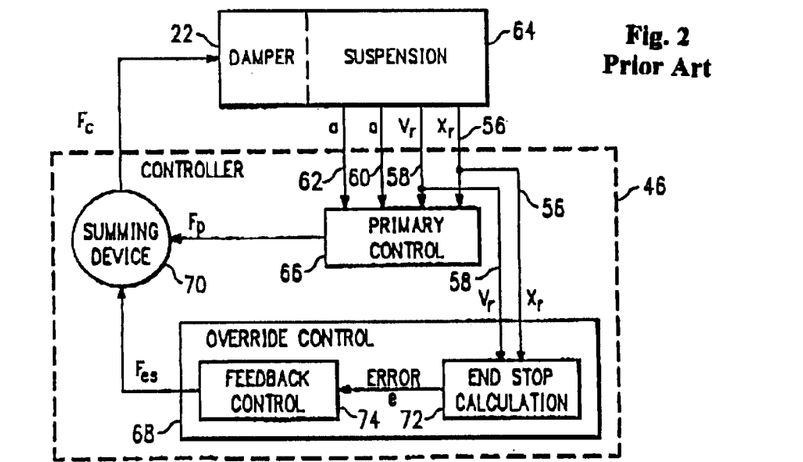
FIG. 2 is a functional block diagram of the system of FIG. 1 illustrating the details of the controller and labeled PRIOR ART.

Referring now to FIG. 2, illustrated is a functional block diagram of the (ESO) system 10 labeled PRIOR ART, showing the details of the controller 46. Suspension block 64 represents the dynamic elements of the system 10 including the members 12 and 14, the spring 20, the damper assembly 22, and the sensors 48, 50, 52, and 54. The controller 46 receives electrical signals from the sensors in the suspension block 64 indicative of the displacement, velocity, and/or acceleration of the members 12 and 14 as discussed above. The controller 46 processes the sensor data in real time using known semi-active control methods to supply damper command force signals Fc to the damper 22. The signals Fc are used to vary the amount of damping of the damper 22 in order to provide improved isolation of the support member 12. While not shown, it will be understood that the controller 46 may be embodied as analog circuitry or as a digital computing system.

In the preferred end-stop override system (ESO) shown in FIG. 2, the controller 46 includes primary control block 66, an override control block 68, and a summing device 70. The primary control block 66 implements a primary control, as discussed further below, to supply primary control command force signals Fp to the summing device 70 based upon the signals received from the suspension block 64 on one or more of the sensor lines 56, 58, 60, and 62. The override control block 68 receives from the suspension block 64 signals on the sensor lines 56 and 58 indicative of the relative velocity Vr and the relative displacement Xr of the members 12 and 14. The override control block implements a unique override control method for supplying end-stop override command force signals (Fes) to the summing device 70. The summing device 70 combines the Fp signal and the Fes signal and, using appropriate gain devices and/or other circuitry, (not shown), supplies the damper command force signal Fc to the damper 22.

The end-stop override command force signal Fes contributes to the damper command force signal Fc only at times when the primary control command force signal Fp is unable to cause the damper to generate a force necessary to avoid an impending end-stop collision. The override control block 68 only intervenes when necessary to prevent end-stop collisions, but otherwise allows the primary control block to govern operation of the system. It should be appreciated that when the ESO control is implemented it only effectuates a change in the on-state force.

The primary control block 66 is preprogrammed to operate in accordance with a standard version of any one of a plurality of semi-active damper control methods and, more particularly, with those methods, and derivatives thereof, which emulate the so-called Skyhook damper as described in Karnopp, D.C. et al., and as cited hereinabove.

The so-called Skyhook control method is based upon the sign of the product of the relative velocity Vr between the supported and supporting members 12 and 14 times the absolute velocity Vabs of the supported member 12. More specifically, the standard version of the Skyhook control method dictates that the damping coefficient of the damper be approximately zero when the product Vabs*Vr is less than zero. This is known as the "off-state" and takes place either (1) when the relative velocity Vr of the members 12 and 14 is positive, i.e., when the members 12 and 14 are separating and the velocity Vabs of member 12 is negative, i.e., downward; or (2) when the relative velocity Vr of the members 12 and 14 is negative, i.e., members 12 and 14 are coming together and the velocity Vabs of member 12 is positive, i.e., upward.

On the other hand, the standard Skyhook control method dictates that the damping coefficient of the damper 22 be proportional to the absolute velocity Vabs when the product Vabs*Vr is greater than zero. This is known as the "on-state" and takes place either (1) when the relative velocity Vr of the members 12 and 14 is positive and the velocity Vabs of member 12 is positive; or (2) when the relative velocity Vr of the members 12 and 14 is negative, i.e., members 12 and 14 are coming together and the velocity Vabs of member 12 is negative.

Figure 3:
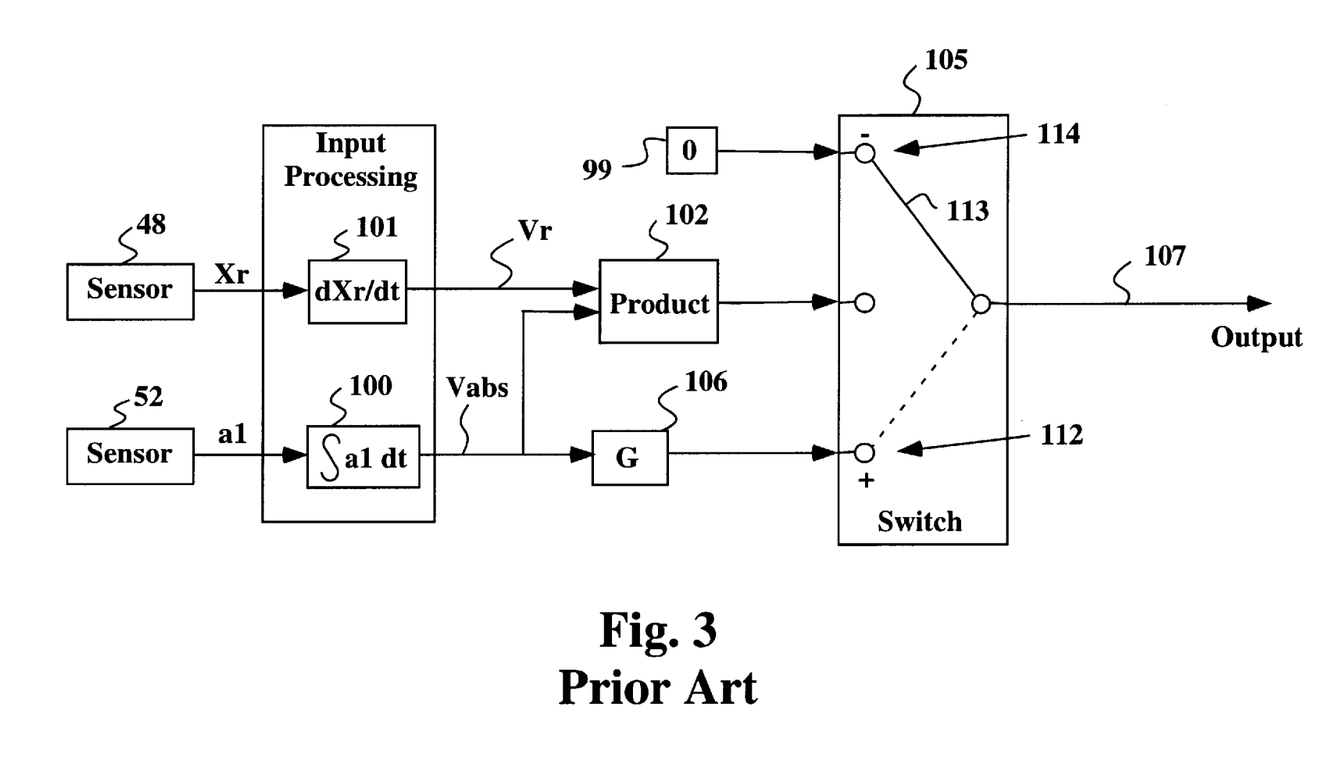
FIG. 3 is a functional block diagram of a primary control method (e.g., the hypothetical Skyhook method) suitable for use in conjunction with the present invention and labeled PRIOR ART.

FIG. 3 is a block diagram which further describes a Skyhook control method of the PRIOR ART. This Skyhook control method requires two system inputs and generates a single control output to drive the controllable damper 22. The first input is the relative position Xr which is obtained by a sensor 48. The Xr signal is sent to an operating block 101, which executes the process of differentiating the relative position signal, as represented by the symbol dXr/dt, and thereby generates a relative velocity signal estimate Vr.

The second input is the absolute acceleration a1, which is obtained from a sensor 52. Subsequently, an operating block 100 performs an integration of the absolute acceleration a1 as represented by the integral of a1 dt designation in the block. The absolute velocity estimate Vabs is thereby generated.

The Vabs signal is then sent to operating block 102. Operating block 102 executes the step of multiplying the absolute velocity Vabs by the relative velocity Vr and thereby generates a signal representing the value Vabs*Vr. This signal is then sent to Skyhook switch block 105. Still referring to FIG. 3, the operating block 99 represents the off-state damper signal and generates a zero value signal at all times. This zero value signal is sent to Skyhook switch block 105. Switch block 105 carries out the primary Skyhook control method. If the product Vabs*Vr is positive, switch block 105 closes the switch as at 112 causing the Vabs, which is scaled by a positive gain factor G as shown in operating block 106, to pass through the switch thereby activating the on-state of the Skyhook control method.

On the other hand, if the product Vabs*Vr is negative, Skyhook switch block 105 closes the switch as at 114 thereby causing the zero value signal to pass through the switch activating the off-state of the Skyhook control method. Thus, either the on-state or the zero value off-state signal (whichever is applicable at a given point in time) is sent as a primary command signal Fp of the primary Skyhook control method to output 107.

Referring again to FIG. 2, it will be understood that the output command signal Fp as at 107 is then sent from the primary control block 66 to the summing device 70 based upon the signals received from the suspension block 64. In its implementation of this Skyhook control method, the primary control block 66 may obtain the necessary data with respect to the relative velocity Vr from the sensor 50 or may derive all of the necessary data from that supplied by the sensors 52 and 54 or from some other source.

Still referring to FIG. 2, the control block 68 implements an end-stop override control method which effectively overrides the aforementioned primary Skyhook control method to produce an increased damper force when necessary to avoid end-stop collisions. According to the preferred embodiment, the end-stop calculation block 72 logically determines when the instantaneous relative velocity Vr of the members 12 and 14 exceeds a predetermined maximum relative velocity value "$Vr^m$" above which an end-stop collision may occur. The end-stop calculation block 72 generates an error value "e," which represents the difference between the instantaneous relative velocity Vr and the maximum allowable relative velocity $Vr^m$ and provides it to a feedback control block 74. The error value "e" may then be used to generate a force that is a function of the error value for feedback to the summing device 70, which generates the end-stop override command force Fes.

Thus, the combination of Skyhook control method and End-Stop Override (ESO) method would seem to provide the best of both worlds in semi-active suspension systems, that is low acceleration and fewer end-stop hits. However, when very severe inputs are exposed to the suspension system, and constraints do not allow adequate force available from the damper, jarring end-stop collisions still may occur even when ESO control method is operative. Therefore, there is a need for an improved control system whereby such extreme inputs are accommodated in such systems where the achievable damping force is limited (as in most, if not all, real world damper systems) and such end-stop collisions are avoided.

SUMMARY OF THE INVENTION

Accordingly, the present invention is an adaptive off-state (AO) control method that generates an off-state force that is a function of the severity of the input disturbances to the suspension system over time. Thus, the present adaptive off-state (AO) method provides a novel and complementary function to prior art suspension systems controlled according to a primary control method (e.g., Skyhook control) and/or an end-stop override (ESO) control method.

In this improved implementation of semi-active control for such suspension systems, the off-state damping of the controllable damper is modulated over time, and more preferably, making the off-state damping a function of an input to the system. It should be understood that according to the prior art Skyhook control method, the damping off-state was set to a zero or low value and that value was not changed, i.e., modulated over time. The modulation may be derived from a user switch or may be a function of the real-time, or time-averaged energy input to the system. By adapting the off-state damping of the damper to the input disturbances to the suspension system, large inputs are better controlled and effective isolation of relatively smaller inputs is maintained.

A significant advantage of the present invention is that the suspension system is better able to accommodate significant changes in the input level. In addition, it has been observed that increasing the off-state damping in conjunction with an end-stop override (ESO) control method reduces end-stop hits when damper force available is limited, such as due to size or force capability restraints of the damper.

The present invention may be utilized to enhance a suspension system operating pursuant to a combined primary control method (e.g., Skyhook) and an end-stop override (ESO) control method as disclosed hereinabove. Alternatively, the present invention may be utilized in lieu of an end-stop override (ESO) control method to eliminate the relative sensor component required in the preferred embodiment thereof. Accordingly, the present invention provides a method of controlling semi-active suspension systems, wherein the off-state damping of an adjustable damper controlled by a primary control method is modulated over time to make such off-state damping a function of the input(s) to the system. In essence, when high input conditions are encountered, the off-state damping is momentarily set to a higher level, thereby minimizing end-stop collisions.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Figure 7:
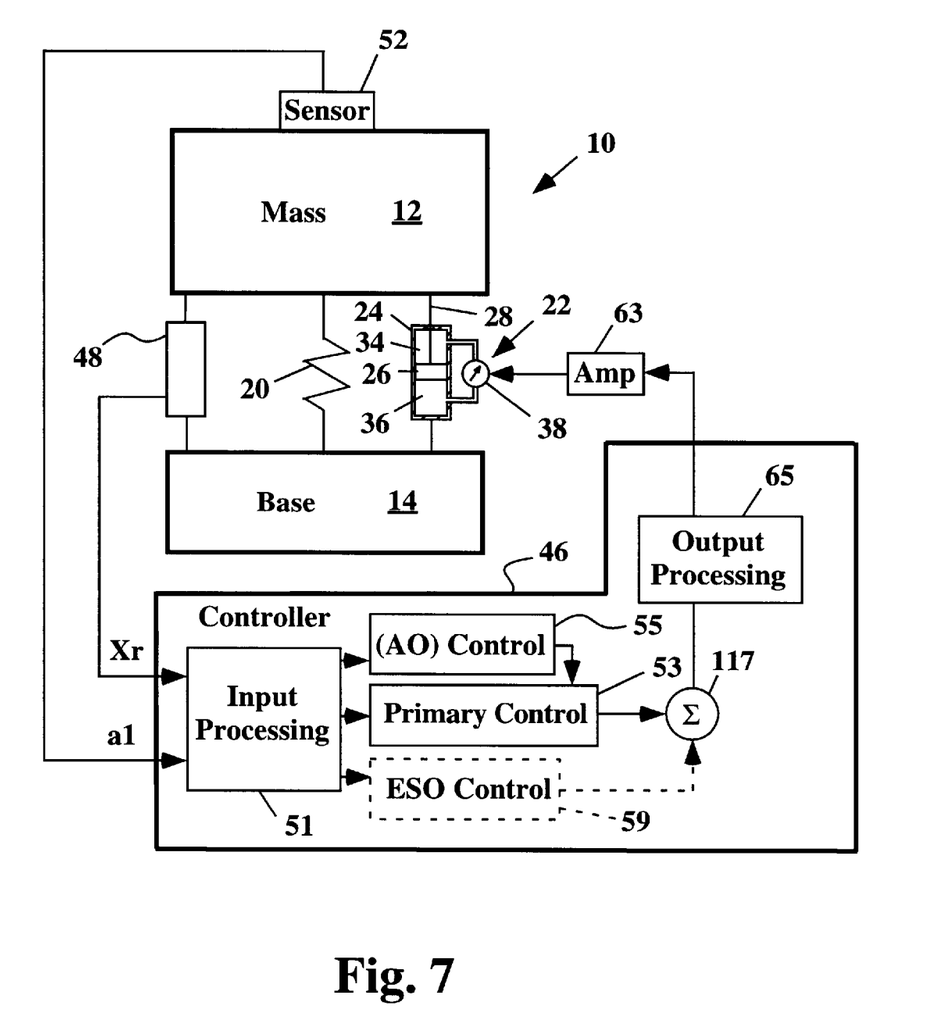
FIG. 7 is a diagram of a suspension system controlled in accordance with the present invention.

Prior to describing the function of the adaptive off-state (AO) control method of the present invention in detail, it may be beneficial to review the structure and function of a semi-active suspension system with which the present invention will be utilized. With reference to FIG. 7, there is shown therein a one degree of freedom semi-active suspension system 10, or other similar isolation system of a type wherein the adaptive off-state control method of the present invention is to be utilized. The system 10 interconnects vertically-spaced and relatively movable members 12 and 14. By way of illustration, the members 12 and 14 may be a mass (for example, a suspended seat and operator) and support base (for example, a vehicle structure) of the suspension system 10, respectively. Alternatively, the mass 12 may comprise a vehicle body structure and the base 14 may be a suspension component. The suspension system 10 functions to isolate the supported member 12 from vibrational forces transmitted by the support member 14 by input disturbances such as road surface irregularities and abrupt impacts.

A primary suspension spring 20 (such as a coil or air spring) and a controllable damper 22 extend in substantially parallel relation to each other between the members 12 and 14 and are connected thereto. The damper 22 is preferably a hydraulic piston-and-cylinder type including a hydraulic cylinder 24 enclosing a piston 26. A piston rod 28 is mechanically coupled to the piston 26 and is secured to the supported member 12 by suitable attaching hardware. The cylinder 24 is similarly secured to the supporting member 14 by suitable attaching hardware. The damper 22 may be of any suitable type, such as a magnetorheological fluid damper as described in U.S. Pat. No. 5,878,851, a controllable orifice damper as taught in U.S. Pat. No. 5,207,774, or any other suitable controllable damper such as an electrorheological or electrophoretic damper.

Relative vertical movement between the members 12 and 14 causes relative vertical movement between the cylinder 24 and the piston 26, which in turn displaces a hydraulic fluid between the upper and lower variable volume fluid chambers 34, 36 of the cylinder 24 via an electrically or otherwise adjustable control valve 38 interconnecting such chambers.

The damper 22 is preferably a continuous force type described in Ivers et al., "Experimental Comparison of Passive, Semi-Active On/Off, and Semi-active Continuous Suspensions", SAE Technical Paper Series No. 892484, November 1989. The damper 22 is rapidly switchable between on "off-state" and an "on-state" wherein a desired force is created independently of the velocity across the damper. Changes in the damping state of the damper assembly 22 result from control signals imparted to the control valve 38 that cause the valve to throttle or otherwise restrict fluid flow through the valve. The valve 38 may be mechanical, or of the controllable fluid type such as magnetorheological, electrorheological, or any other type suitable for rapid operation.

A suitable electronic controller 46 receives the inputs from the sensors 48, 52, input processes them in an input processing section 51 and provides inputs to the primary control 53, the optional ESO control 59, and the Adaptive Off-State (AO) control 55. The output from the primary control 107 is provided to a summing junction 117 where it is summed with the output of the ESO control 59, if any. It should be recognized that the AO control 55 adaptively sets the value of the off-state command signal 109 of the primary control 53 which is rapidly switchable between on- and off-states. The summed signal is then provided to amplifier 63 which provides the appropriate current or voltage to the valve 38 to adjust the damping of the damper 22.

In accordance with the adaptive off-state (AO) control method of the present invention wherein the off-state command signal 109 of a damper 22 is input to a suitable primary (e.g., Skyhook) control method 53 and is modulated over time to make the off-state damping generated by the damper 22 a function of the input disturbances to the suspension system 10. By adapting the off-state to the inputs to the system, large inputs are better controlled and effective isolation of relatively smaller inputs is maintained as will now be explained in further detail.

Figure 4:
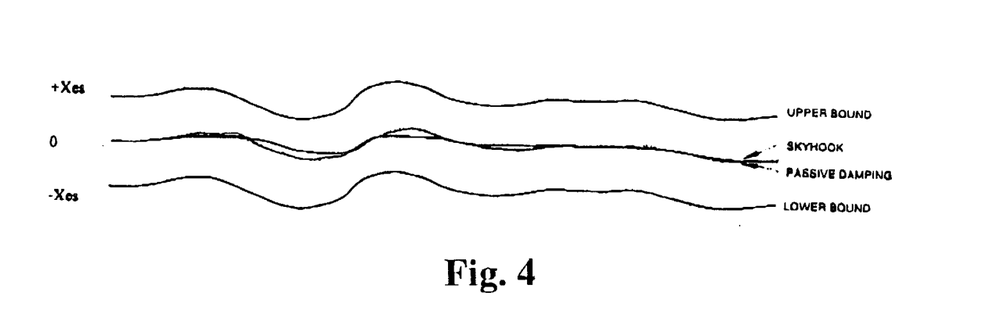
FIG. 4 is a graphic representation of the performance of a passive damping device in comparison to a Skyhook controlled damper relative to the available suspension travel at low input levels.

Referring now to FIG. 4, there is shown a graphical comparison of the relative displacement (X-Y) of members 12 and 14 over time when the support member 14 is subjected to low input levels under a Skyhook controlled damper versus a passive damping device. The upper and lower bound curves represent the limits of travel of the suspension system 10. Under these conditions, the relative displacement X-Y is small in comparison to the available suspension travel and the Skyhook controlled damper performs better than the passive device as shown.

Figure 5:
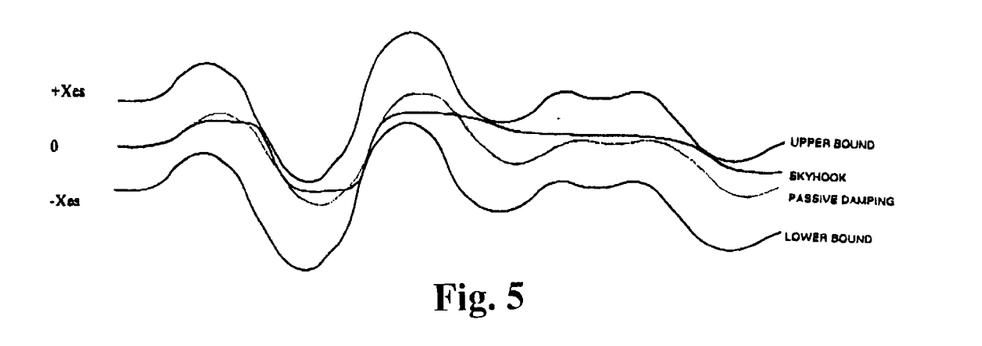
FIG. 5 is a graphic representation of the performance of a passive damping device in comparison to a Skyhook controlled damper relative to the available suspension travel at high input levels.

At high input levels the relative displacement (X-Y) may exceed the available suspension travel limits as illustrated in FIG. 5. In this situation the Skyhook control method tends to create flattened regions in the displacement graph which often result in end-stop hits when the input disturbances are at a sufficiently high level.

Figure 6:
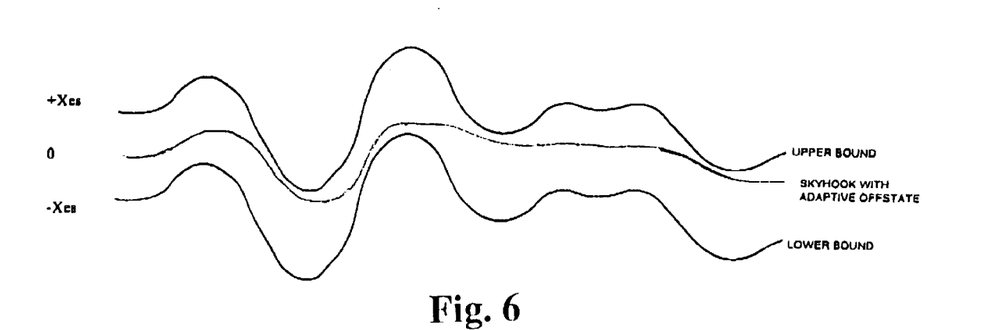
FIG. 6 is a graphic representation of the performance of a Skyhook controlled damper wherein the adaptive off-state control method of the present invention has been implemented at high input levels.

FIG. 6 depicts the result of increasing the off-state of the Skyhook controlled damper for large inputs in accordance with the present invention adaptive off-state control method. The net result is more fluid motion that avoids end-stop hits and remains an improvement over passive damping.

Figure 8:
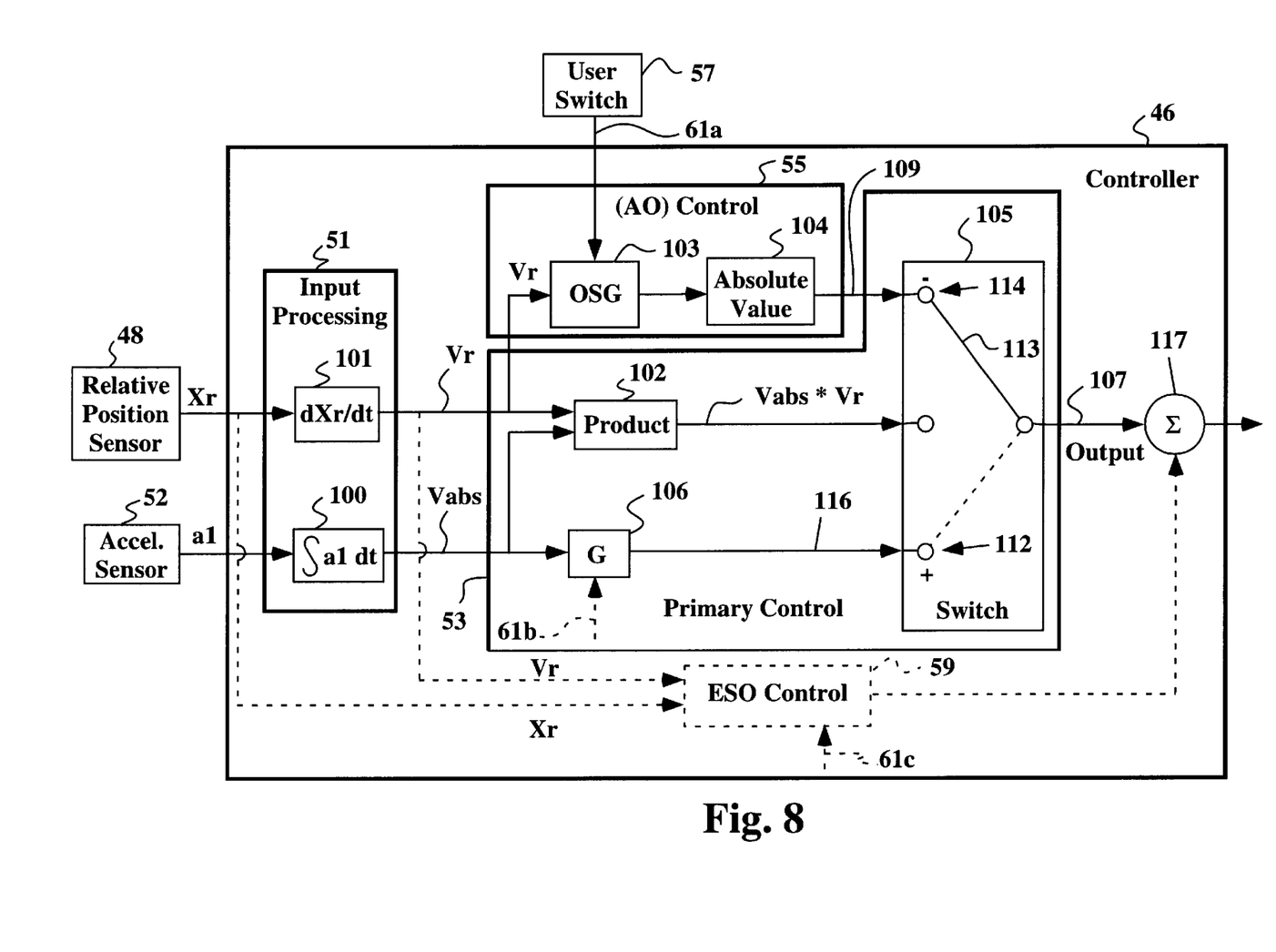
FIG. 8 is a functional block diagram of a primary control method implemented in conjunction with the user selectable off-state gain method of the present invention.

FIG. 8 depicts a block diagram which describes a first embodiment of the Adaptive Off-state (AO) control method 55 of the present invention. The block diagrams of FIG. 8–12 will also be described referencing the components of the system shown in FIG. 7. This (AO) control method 55 operates in conjunction with a primary control method 53 and each require data inputs regarding the conditions of operation of the system 10. The output 107 is a single control output to drive an amplifier 63 and the controllable damper 22. Output conditioning 65 is also present as a reconstruction filter or an Digital to Analog filter. The first input is the relative position Xr, which is obtained from a sensor 48 (e.g., a relative displacement sensor). The Xr signal is sent to an operating block 101 within the input processing block 51 of controller 46, which executes the process of differentiating the relative position signal Xr, as represented by the symbol dXr/dt, and thereby generates a relative velocity signal Vr. Of course, Vr could optionally be provided directly by a relative velocity sensor. Moreover, anti-alaising and/or analog to digital converters may also be present in the input processing 51 as is known to persons of ordinary skill in the art.

The second input is the absolute acceleration al of the suspended mass 12 which may be obtained from a sensor 52 (e.g., an accelerometer). Subsequently, an operating block 100 in input processing 51 performs an integration of the absolute acceleration al, as represented by the integral of al dt designation. The absolute velocity signal Vabs is thereby generated. The Vabs signal is then sent to operating block 102 and gain block 106 of the primary control 53. Optionally, the Vabs signal may be estimated from other sensor information.

Referring to the output of operating block 101 in FIG. 8, the relative velocity Vr is sent to operating block 102 of the primary control 53 and to Off-State Gain (OSG) block 103 of the Adaptive Off-state (AO) control 55. Operating block 103 is a gain block that executes the step of scaling the relative velocity Vr by an input 61a from a user switch 57. Soft, medium, and firm settings may be provided, for example, to control the off-state gain value OSG of the block 103. Moreover, the user switch 57 may provide inputs, for example, in lines 61b, 61c to control the on-state gain G of block 106 of the primary control 53 as well as control gains (not shown) of the ESO control 59. The OSG block 103 multiplies a user-selected gain value by the signal Vr. Subsequent to operating block 103, an operating block 104 takes the absolute value of the scaled relative velocity and sends the resulting off-state command signal 109 to upper switch element 114 of the Skyhook switch block 105 of the primary control 53.

Still referring to FIG. 8, operating block 102 executes the step of multiplying the absolute velocity Vabs by the relative velocity Vr and thereby generates a signal representing the value Vabs*Vr. This signal is then sent to the central switch element of the Skyhook switch block 105. The switch block 105 carries out the primary (Skyhook control method), which is utilized in conjunction with the present invention (AO) control method 55. If the product Vabs*Vr is positive, operating block 105 disconnects connector 113 and closes the Skyhook switch 105 at switch element 112 (as shown dotted) causing the Vabs signal, as attenuated or amplified by the gain G of block 106, to pass through the switch 105 thereby providing an output signal 107 representing the on-state command signal 116 to the amplifier 63 and subsequently to damper 22. This output signal 107 is proportional to Vabs in accordance with the primary control method 53.

However, if the product Vabs*Vr is negative, switch block 105 closes the connector 113 of Skyhook switch as shown at 114 (shown solid) and thereby causes the absolute value of the scaled relative velocity signal (the off-state command signal 109) to pass through the switch 105 thereby activating the off-state of the primary Skyhook control method 53. The off-state output signal 109 is derived by the AO control 55 and is given by equation 1:

$$\text{Off-State Command Signal}=\text{Abs}\{OSG*Vr\}. \quad (1)$$

Unlike the prior art, the off-state command signal of the present (AO) control method 55 is a changeable or adapting value. Thus, either the on-state value at 112 or the adaptive off-state signal at 114 (whichever is applicable at a given point in time), is provided as an output 107. It should be appreciated that the signal at 114 is the resulting off-state damper command signal 109 as adapted by the user switch 57 of the present adaptive off-state (AO) control 55. Accordingly, it should also be recognized that when the user encounters conditions which lead to large inputs, the user may set the off state gain OSG at block 103 to a higher value via switch 57 thereby adapting and changing the off state command signal 109 of the primary control method 53 over time. This helps prevent end-stop collisions. Moreover, it should be recognized that the AO control method may be utilized in addition to End Stop Override (ESO) Control 59 wherein, if the ESO control is utilized, the output is summed at a summing junction 117.

Figure 9:
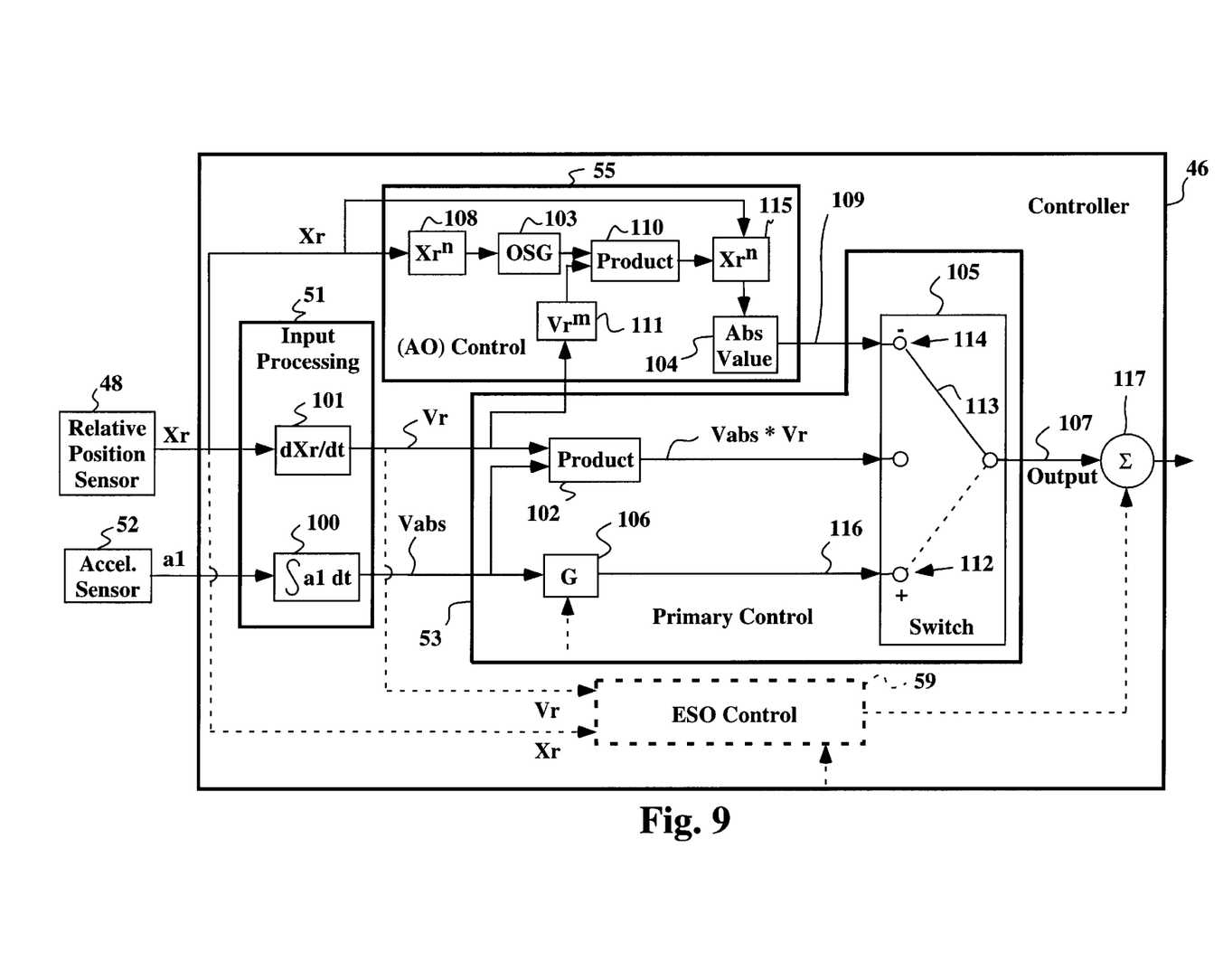
FIG. 9 is a functional block diagram of a primary control method implemented in conjunction with a fully adaptive off-state gain method of the present invention.

FIG. 9 depicts a block diagram that describes another embodiment of the adaptive off-state (AO) control method 55 of the present invention. This system 10 also requires two system inputs and generates a single control output 107 to drive a semi-active damper 22. The first input is the relative position Xr, which is preferably obtained by a relative position sensor 48. The Xr signal is then sent to operating blocks 101 of the input processing section 51 and calculation block 108 of the (AO) control 55. Operating block 101 executes the process of differentiating the relative position signal Xr, as represented by the symbol dXr/dt, and thereby generates a relative velocity signal Vr which is sent to product block 102 of the primary control 53 and exponent block 111 of the (AO) control 55.

The second input is the absolute acceleration a1, which may be obtained by an acceleration sensor 52 in FIG. 7. Subsequently, an operating block 100 performs an integration of the absolute acceleration a1 as represented by the integral of a1 dt. The absolute velocity signal Vabs is thereby generated. Optionally, Vabs may be estimated from other parameters. The Vabs signal is then sent to operating product block 102 and primary gain block 106.

Referring now to the upper portion of the block diagram of FIG. 9, operating block 108 receives the relative position Xr signal and performs a calculation therewithin. In this embodiment, the calculation is to raise Xr to the exponent n, where n is most preferably 1, but may optionally be 2, 3, etc. Operating block 103 performs the function of receiving the signal from block 108 and generates an output value (e.g., OSG) that is obtained from, for example, a look-up table programmed in the controller 46. The lookup table includes a plurality of values of Off-State Gain (OSG) which correspond to a plurality of values of inputs, for example. Of course, the table values are selected based upon some knowledge of the particular system and expected inputs. Operating block 110 executes the function of multiplying the output signal of the operating block 103 (which is an OSG value) by the relative velocity Vr signal raised to the exponent m in block 111, where m is preferably 1, buy may optionally be 2, 3, etc. The output of the product block 110 which is $OSG*Vr^m$ is then multiplied by $Xr^n$ in block 115, where n is most preferably 2, but may also be 1, 3, etc. The operating block 104 then serves the function of taking the absolute value of the product of operating block 115 and sends the resulting off-state signal 109 to switch element 114 of the Skyhook switch block 105 of the primary control 53.

Referring again to the central portion of FIG. 9, operating block 102 executes the step of multiplying the absolute velocity Vabs by the relative velocity Vr and thereby generates a signal representing the value Vabs*Vr. This signal is then sent to the central switch element of switch block 105. Switch block 105 carries out the primary Skyhook control method 53. If the product Vabs*Vr is positive, switch block 105 closes the connector 113 of switch as at 112 (shown dotted) and thereby causes the Vabs signal multiplied by gain G of primary gain block 106 (collectively, the on-state damping signal 116) to go through the switch 105 activating the on-state of the primary (e.g., Skyhook) control method 53 and providing an output at 107.

On the other hand, if the product Vabs*Vr is negative, switch block 105 closes the connector 113 switch at 114 (shown solid) and causes the off state command signal calculated by the AO control 55 to pass through the switch thereby activating the off-state of the primary (e.g., Skyhook) control method 53. Unlike the prior art, the adaptive off-state method of the present invention is an adaptive value (generally, a non-zero or non-minimum value, for example, when Vr is non zero). Thus, either the on-state signal 116 at switch 112 which comprises Vabs scaled by the gain G of block 106 or the off-state signal 109 at switch 114, (whichever applicable at a given point in time) becomes the output signal at 107. This output signal at 107 is provided to the output processing 65 and amplifier 63 thereby appropriately conditioning (e.g., converting to analog) and amplifying the signal provided to the damper 22.

The control methods described in both FIGS. 8 and 9, although illustrated as a mechanical switch, may be executed as logical operations by computer program instructions stored in the controller 46. The actual program code to perform these functions may be generated using conventional programming techniques and is omitted for clarity.

From the foregoing, it should now be apparent that the present AO control method in accordance with the present invention generates an off state command signal that is a function of the severity of the input disturbances that have occurred over the last several cycles, and preferably during a time window ranging from about 1 to about 50 seconds and most preferably about 10 seconds. It will be understood that if such an increased off-state is present when the input returns to a low level, the "ride" of the suspension is unnecessarily degraded. Thus, in accordance with the present invention, the off-state damping signal 109 provided to the conditioning 65, amplifier 63 and the controlled damper 22 is modulated over time to achieve the improved performance of the present method as hereinafter described.

The relationship between the off-state command signal and the input level may take either a real-time form, a time-averaged form, or a combination thereof. An example of a preferred real-time relationship is expressed in equation (2) as follows:

$$\text{Off-state Command Signal}=\text{Abs}\{OSG*Vr^m*Xr^n\} \qquad (2)$$

where m and n are positive and OSG is the overall gain. This equation (2) is implemented in FIG. 9. Equation (2) dictates that if the relative displacement Xr and the relative velocity Vr are both high, then increase the off-state command signal 109 because there must be significant inputs present in the system 10.

An example of a time-averaged relationship is expressed in equation (3) as follows:

$$\text{Off-State Command Signal}=\text{Abs}\{OSG*Vr^m*\text{Avg}[Xr^n]\} \qquad (3)$$

where Avg is a function that averages over time, for example, by an integrating filter, exponential moving average, or a peak-detect with decay. An implementation of equation (3) may be accomplished by replacing $Xr^n$ of block 115 of FIG. 9 with the Avg $Xr^n$. It will be understood that any function based upon the above equations (2) and (3) which is deemed computationally inefficient may be embodied in a one-dimensional lookup table. Additionally, a signal from an accelerometer (not shown) attached to the input side of the suspension could be utilized as an input to the lookup table 103 of FIG. 9 instead of the output of block 108. This might well improve performance, but would not be cost effective for most applications.

Figure 10:
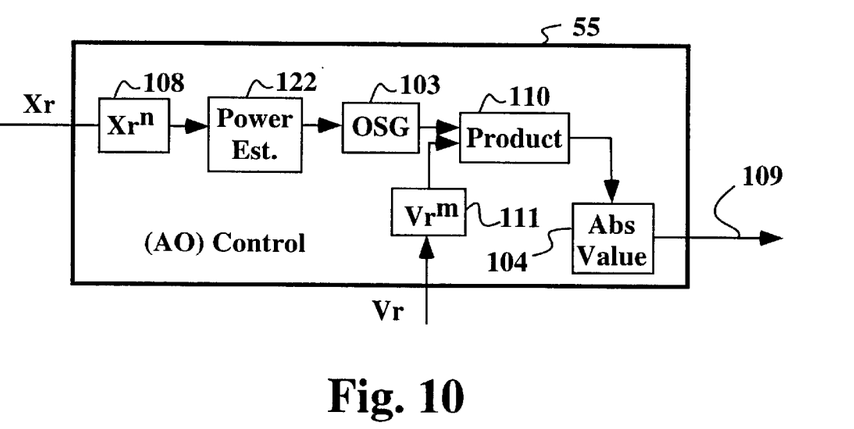
FIG. 10 is a functional block diagram of another embodiment of fully adaptive off-state gain method of the present invention.
Figure 11:
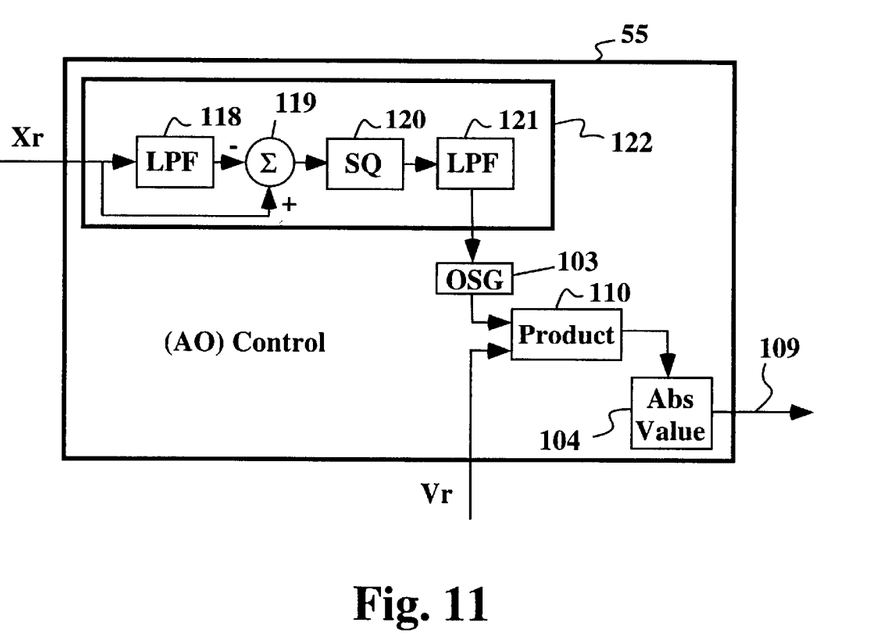
FIG. 11 is a functional block diagram of another embodiment of fully adaptive off-state gain method of the present invention.

In a preferred embodiment of OS Control 55 as illustrated in FIG. 10, the off-state command signal is derived based upon a power estimate. FIGS. 10 and 11 below illustrate only the AO control 55 shown in isolation. However, it should be understood that the output is the off-state command signal 109 that is provided to the primary control 53 as in the previously described embodiments.

The Off-State Gain (OSG) from block 103 is multiplied by $Vr^m$ (where m is most preferably 1) and then the absolute value is taken in 104. OSG in block 103 is a constant which is multiplied by the output of the power estimator block 122 to be described in more detail below. The input to the power estimator 122 is the output of block 108, which in a preferred embodiment is the relative velocity $Xr^n$, i.e., n is preferably equal to 1. Thus, this embodiment is represented by equation (4):

$$\text{Off-State Command Signal} = \text{Abs}[OSG*\text{POWER } EST*Vr^m] \quad (4)$$

The more specific embodiment as illustrated in FIG. 11 generates an Off-State Command Signal 109 that may be described as:

$$\text{Off-State Command Signal} = \text{Abs}[OSG*Vr*LPF[\{Xr-LPF\ Xr\}^2]] \quad (5)$$

where the Power Estimate of block 122 is given by:

$$\text{POWER } EST = LPF[\{Xr-LPF\ Xr\}^2]. \quad (6)$$

The relative displacement Xr is provided to a low pass filter 118 and its output is subtracted from Xr at summer 119. The output of the summer 119 is squared in operator block 120 and the output thereof is again low pass filtered in Low Pass Filter (LPF) 121. The output of the LPF 121 is an estimate of the power in the system 10, i.e., an indication of the severity of the input. This power estimate from power estimator 122 is multiplied by an off-state gain OSG from block 103. The output of block 103 is then multiplied by Vr at 110 and finally, the absolute value thereof at operator block 104 is passed on to the primary control as the off-state command signal 109.

Figure 12:
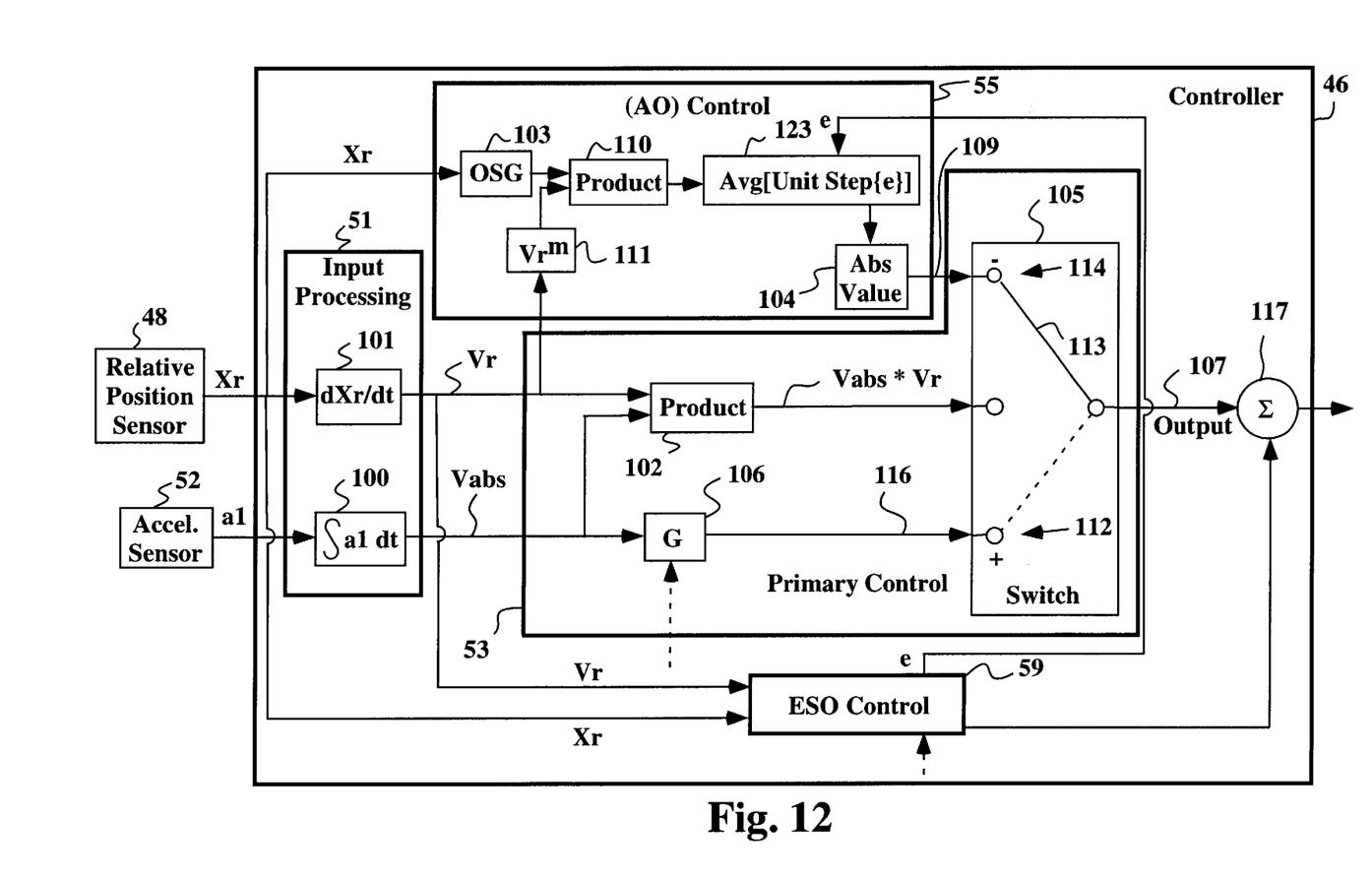
FIG. 12 is a functional block diagram of another embodiment of fully adaptive off-state gain method of the present invention.

Yet another embodiment of the AO control method 55 for adapting the off-state of a primary switchable control method 53 is illustrated in FIG. 12. This embodiment utilizes the aforementioned end-stop override (ESO) error "e" as an input to the AO control 55. The error "e" is already available as a calculated, time-varying, value in the end-stop override (ESO) control 59. The off-state comm and signal may be described as follows:

$$\text{Off-State Command Signal} = \text{Abs}[OSG*Vr^m*\text{Avg}[\text{Unit Step }\{e\}]] \quad (7)$$

where the Ave[Unit Step[ ]] preferably operates as a counter with decay. The Unit Step [ ] equals a value of zero when the value in the [ ] (e.g., the error "e") is negative and has a value of one when the value in the [ ] is positive. Thus, the Avg function only averages positive values of error "e". Notably, the error "e" is only positive when the ESO control 59 determines that an end stop collision is likely to occur. As shown in FIG. 12, the AO control 55 multiplies in block 110 the output off-state gain (OSG), in this case a constant value, from block 103 with $Vr^m$ from block 111, where m is preferably 1. The output of the product block is multiplied by the Avg [Unit Step {e}] in block 123. Note that the error "e" is provided as an output from the ESO Control 59. Finally, the absolute value of the entire product is passed on to the primary control 53 as the off-state value 109. Essentially, the result of this embodiment is that the off-state damping is increased if the suspension system 10 has been operating in the (ESO) mode. The primary 53 and secondary controls 59 operate as previously described.

In practical application of the present adaptive off-state (AO) method, the off-state damping in a controllable damper 22 is a matter of tuning a particular suspension to a given application and expected inputs. Initially, the parameters of the system 10 are initialized and vary depending on the dimensions, damper configuration and operating environment of the system.

Although not specifically illustrated in the drawings, it should be understood that additional equipment and structural components will be provided as necessary, and that all of the components described above are arranged and supported in an appropriate fashion to form a complete and operative system 10 incorporating features of the present invention.

It is also understood that variations may be made in the present invention without departing from the scope of the invention. For example, the system 10 may be employed in vehicles of all types, or may be used in aircraft or aerospace applications. The system 10 may also be used for improving isolation in stationary systems. It is contemplated that any one of a variety of switchable primary control methods may be used in conjunction with the AO Control method for controlling the damper 22. Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A method for controlling the operation of a suspension system including a controllable damper having an on-state and an off-state interconnected between a supporting and supported members, the method comprising the steps of:
    monitoring the conditions of operation of the suspension system and generating data indicative thereof;
    providing damper command signals to the controllable damper to adjust damping thereof in the on state in accordance with primary control method; and
    automatically modulating the damper command signals for the off-state over time based upon an input severity in order to adapt an off-state damping value with respect to the input severity.

2. The method of claim 1 wherein the step of providing is carried out by a controller implementing a Skyhook control method.

3. The method of claim 1 further including the additional step of:
    altering the damper command signals provided to the controllable damper during the on-state as determined in accordance with a secondary control method to change the damping at times when the system under control of the primary control method alone will exceed an end stop thereby minimizing end-stop collisions.

4. The method of claim 3 wherein the step of altering is carried out in accordance with an end-stop override control method.

5. The method of claim 1 wherein the step of modulating is a real-time function of a relative displacement between the members.

6. The method of claim 1 wherein the step of modulating is a function of a relative velocity between the members.

7. The method of claim 1 wherein the step of modulating is a function of a relative displacement and a relative velocity between the members.

8. The method of claim 1 wherein the step of modulating is a function of an off-state gain that is derived dependent upon the magnitude of a relative displacement between the members.

9. The method of claim 1 wherein the step of modulating includes an adaptive off-state gain.

10. The method of claim 1 wherein the step of modulating is represented by the equation: Off-State Command Signal= Abs{OSG*$Vr^m$*$Xr^n$}, where (OSG) is an off-state gain, (Vr) is a relative velocity between the members and (m) is an exponent, (Xr) is a relative displacement between the members and (n) is an exponent.

11. The method of claim 1 wherein the step of modulating further includes a step of generating an off-state signal based upon reference to a look-up table.

12. The method of claim 1 wherein the controllable damper is a controllable fluid damper.

13. The method of claim 1 wherein said controllable damper is a magnetorheological fluid damper.

14. The method of claim 1 wherein the step of modulating is a function of a time-averaged relative displacement between the members.

15. The method of claim 1 wherein the step of modulating is expressed by the equation: Off-State Command Signal= Abs[OSG*$Vr^m$*Ave[Unit Step{e}]], where (OSG) is an off-state gain, (Vr) is a relative velocity between the members and (m) is an exponent, (e) is a error generated by a secondary control method.

16. The method of claim 1 wherein the step of modulating is represented by the equation: Off-State Command Signal= Abs[OSG*$Vr^m$*Ave[$Xr^n$]], where (OSG) is an off-state gain, (Vr) is a relative velocity between the members and (m) is an exponent, (Xr) is a relative displacement between the members and (n) is an exponent.

17. The method of claim 1 wherein the step of modulating is a function of a power estimate.

18. The method of claim 17 wherein the power estimate is a function of a relative displacement between the members.

19. The method of claim 1 wherein the step of modulating is a function of a constant off-state gain and at least one motion selected from a group consisting of:
   a) a relative displacement between the members, and
   b) a relative velocity between the members.

20. A method for controlling the operation of a suspension system including a controllable damper having an on-state and off-state interconnected between a supporting and supported members, the method comprising the steps of:
   monitoring the conditions of operation of the suspension system and generating data indicative thereof;
   generating from the data a relative displacement signal and a relative velocity signal;
   processing the relative displacement signal and the relative velocity signal to provide damper command signals to the controllable damper to adjust damping thereof in the on-state in accordance with a primary control method; and
   modulating the damper command signals for the off-state in accordance with the relative displacement signal in order to adapt an off-state damping value with respect to the relative displacement signal.

21. A method for controlling the operation of a suspension system including a controllable damper having an on-state and off-state interconnected between a supporting and supported members, the method comprising the steps of:
   monitoring the conditions of operation of the suspension system and generating data indicative thereof;
   generating from the data a relative displacement signal and a relative velocity signal;
   processing the relative displacement signal and the relative velocity signal to provide damper command signals to the controllable damper to adjust damping thereof in the on-state in accordance with a primary control method; and
   modulating the damper command signals for the off-state in accordance with a measure of power in the system in order to adapt an off-state damping value with respect to the measure of power.

22. A system for controlling the operation of a suspension system, comprising:
   a controllable damper having an on-state and an off-state, the controllable damper operable to receive a command signal to activate the on-state or the off-state;
   a sensor system having an input representative of a condition of operation of the suspension system and generating output data indicative thereof; and
   a controller in communication with the controllable damper and the sensor system, the controller having a processor for receiving the output data from the sensor system and for generating the command signal according to a first predetermined control parameter, wherein the first predetermined control parameter automatically modulates the command signal for the off-state over time based upon the condition of operation in order to adjust an off-state damping value with respect to the condition of operation.

23. A system for controlling the operation of a suspension system, comprising:
   a controllable damper having an on-state and an off-state, the on-state corresponding to an on-state damping characteristic and the off-state corresponding to an off-state damping characteristic, where the on-state damping characteristic is greater than the off-state damping characteristic, the controllable damper operable to receive a command signal to activate the on-state or the off-state;
   a sensor system having an input representative of a condition of operation of the suspension system and generating output data indicative thereof;
   an off-state processor operable to receive a first input corresponding to the sensor system output data and operable to generate an off-state signal based thereon, wherein the off-state signal is automatically modulated over time based upon the condition of operation in order to adjust an off-state damping value with respect to the condition of operation;
   an on-state processor operable to receive a second input corresponding to the sensor system output data and operable to generate an on-state signal based thereon, wherein the on-state signal activates a primary control parameter for actively controlling the controllable damper; and
   a controller in communication with the off-state processor and the on-state processor, the controller operable to generate the command signal based on the off-state signal or based on the on-state signal depending on the condition of operation.

24. A suspension system, comprising:
   a supporting member;
   a supported member;
   a semi-active damper interconnected between the supporting member and the supported member, the damper having an on-state and an off-state, the damper switchable between the on-state and the off-state by a command signal;
   a sensor system operable to receive a system input representative of an operating condition of the supported member relative to the supporting member and to generate output data representative thereof;

a primary control mechanism for receiving the output data and generating an on-state control signal, the on-state control signal associated with one of a plurality of on-state damping characteristic for controlling the damper in the on-state in accordance with a first set of predetermined instructions as determined by the output data;

an off-state control mechanism for receiving the output data and generating an off-state control signal, the off-state control signal associated with one of a plurality of off-state damping characteristics for controlling the damper in the off-state in accordance with a second set of predetermined instructions as determined by the output data, wherein the off-state control signal is automatically modulated over time based upon the output data in order to adjust an off-state damping value with respect to the output data; and a controller for generating the command signal based on the on-state control signal or the off-state control signal, the controller comprising a switching mechanism for selectively receiving the on-state control signal or the off-state control signal in accordance with a third set of predetermined instructions as determined by the output data.

* * * * *